United States Patent [19]
Jansen et al.

[11] Patent Number: 4,896,402
[45] Date of Patent: Jan. 30, 1990

[54] CABLE TIE

[75] Inventors: George A. Jansen, Denver; Hans R. Hinnen, Lakewood, both of Colo.

[73] Assignee: Band-It-IDEX, Inc., Denver, Colo.

[21] Appl. No.: 279,576

[22] Filed: Dec. 2, 1988

Related U.S. Application Data

[63] Continuation-in-part of Ser. No. 152,909, Feb. 5, 1988, abandoned.

[51] Int. Cl.$^4$ .............................................. B65D 63/02
[52] U.S. Cl. ................................ 24/20 R; 24/20 EE; 24/23 B
[58] Field of Search .................... 24/20 R, 23 B, 17 A, 24/17 AP, 16 R, 16 PB, 20 EE, 22, 30.5 P; 285/37, 254

[56] References Cited

U.S. PATENT DOCUMENTS

| | | | |
|---|---|---|---|
| 100,897 | 3/1970 | Hunt | 24/17 AP |
| 157,032 | 11/1874 | Smith . | |
| 163,380 | 5/1875 | Jordan | 24/23 B |
| 356,083 | 1/1887 | Schrader . | |
| 1,022,462 | 4/1912 | Brink | 24/17 A |
| 1,209,119 | 12/1916 | Childress | 24/23 B |
| 2,192,979 | 3/1940 | McAneny, Jr. | 24/23 B |
| 2,338,629 | 1/1944 | Felder et al. | 24/17 A |
| 2,455,760 | 12/1948 | Gustafson . | |
| 2,870,503 | 1/1959 | McAneny | 24/23 B |
| 3,155,355 | 11/1964 | Cappola | 24/20 R |
| 3,660,869 | 5/1972 | Caveney et al. . | |
| 4,222,155 | 9/1980 | Oetiker . | |
| 4,262,406 | 4/1981 | Fredrickson et al. . | |
| 4,272,870 | 6/1981 | McCormick . | |
| 4,333,210 | 6/1982 | Burnett | 24/30.5 P |
| 4,507,828 | 4/1985 | Furutsu . | |
| 4,631,782 | 12/1986 | Gecs | 24/17 AP |
| 4,646,393 | 3/1987 | Young . | |

FOREIGN PATENT DOCUMENTS

| | | | |
|---|---|---|---|
| 571978 | 9/1945 | United Kingdom | 24/20 EE |
| 1032303 | 6/1966 | United Kingdom | 24/20 EE |

Primary Examiner—Victor N. Sakran
Attorney, Agent, or Firm—Sheridan, Ross & McIntosh

[57] ABSTRACT

A clamping device is provided in the form of a one-piece cable tie. The cable tie includes a band section having a free end for positioning about an object to be constrained, such as an electrical cable, and a buckle section through which the free end of the band section is inserted. In a preferred embodiment, the buckle section includes a first portion operatively connected to the band and terminating adjacent a slot. A second, raised portion of the buckle section is longitudinally or horizontally offset from the first portion. The second portion extends from a point adjacent the aforementioned slot to a free end. The width of the slot occupied by the band is greater when the band is loosely wrapped about the object constrained. The greater width of the slot when the band is loosely wrapped facilitates single or multiple wrappings of the object constrained. Any gaps between the band the object constrained are reduced by positioning only the first portion of the buckle section adjacent the object thereby improving clamping. Lips are also provided on the buckle section to accommodate positioning of the buckle section in a grooved area formed in the object being constrained. The cable tie is preferably made by a machining process in which buckle sections are alternately formed on opposing sides of a sheet of metal material to enhance the use of the material and avoid waste.

10 Claims, 8 Drawing Sheets

CABLE TIE

CROSS-REFERENCE TO RELATED APPLICATIONS

The present application is a continuation-in-part of the United States patent application for a "Cable Tie" having U.S. Pat. Ser. No. 07/152,909 and filed on Feb. 5, 1988.

FIELD OF THE INVENTION

The present invention relates to a clampinq device and, in particular, to a cable tie for constraining electric cable or the like.

BACKGROUND OF THE INVENTION

A number of fastening or clamping devices have been devised for a variety of purposes. In one application, clamps are used with electrical systems for the purpose of connecting electric shielding or insulation about electric wires. In particular, such clamps connect the shield to an electrical connector that typically receives current carrying conductors. In U.S. Pat. No. 4,646,393 to Young, issued Mar. 3, 1987 and entitled "Clamping Band for Electromagnetic Shielding Band Cable Connector," a clamping device is disclosed for use in constraining electromagnetic shielding. The device is a one-piece cable tie in which a buckle is formed at one end of the band. The buckle includes a pair of abutting wings that are welded together after folding thereby creating a single, longitudinally extending opening. The free end of the band can be inserted through the buckle opening a number of times to provide a number of band revolutions or spirals.

A commercially available cable tie made by the assignee of the present invention includes a buckle having a raised section with slots formed on opposing sides of the raised section. The raised section is formed by punching the buckle in two opposing directions. The buckle side edges are flat and not raised. The band of the cable tie is inserted through the two buckle slots during each wrap of the band about the object to be held or constrained. This type of cable tie has also been made as one-piece.

Other representative one-piece clamps are illustrated in U.S. Pat. No. 356,083 to Schrader, et al., issued Jan. 11, 1887 and entitled "Clamp For Hose Couplings" and U.S. Pat. No. 157,032 to Smith, issued Nov. 17, 1874 and entitled "Bail-Ties". In the Schrader, et al. patent, a hose clamp is described having a number of projections that can be folded to provide a buckle or catch-like configuration. In the Smith patent, wings integrally formed with the band are bent over to engage portions of the band. A one-piece cable tie is also described in U.S. Pat. No. 3,660,869 to Caveney, et al., issued May 9, 1972 and entitled "One-Piece Cable Tie". This cable tie is characterized by the use of a row of teeth disposed on one longitudinal surface of the strap. The patent also describes a molding process for making the cable ties. One-piece cable ties similar to that disclosed in Caveney, et al., are described in U.S. Pat. No. 4,272,870 to McCormick, issued Jun. 16, 1981 and entitled "Synthetic Plastics Tie Member" and U.S. Pat. No. 4,507,828 to Furutsu, issued Apr. 2, 1985 and entitled "Bundling Belt Device". The cable ties of McCormick and Furutsu are both characterized by the use of serrated teeth disposed on one longitudinal surface of the band. Attachment of the band to buckle in the McCormick patent is achieved by engagement of the serrated teeth with complementary teeth disposed on the interior of the upper surface of the buckle. In contrast, attachment of the band to the buckle in the Furutsu invention is accomplished by engagement of the serrated teeth with a single, ratchet-like tooth disposed on the interior of the lower surface of the buckle.

Multi-piece clamps are illustrated in U.S. Pat. No. 2,455,760 to Gustafson, issued Jan. 20, 1943 and entitled "Hose Clamp" and U.S. Pat. No. 4,262,406 to Fredrickson et al., issued April 21, 1981 and entitled "Method of Assembling Strapping". The Gustafson invention is characterized by one or more clips under which, or through which, a separate metallic strap is disposed. The invention of Fredrickson et al. includes a strap fastener having a plurality of slots for receiving a separate, flexible strap. A two-piece cable tie is also described in U.S. Pat. No. 4,222,155 to Oetiker, issued Sept. 16, 1980 and entitled "Hose Clamp". The invention of Oetiker includes a band having at least one tapered end for engaging the other end of the band in a continuously smooth, stepless fashion to reduce any gap existing between the band and object encircled. A separate bridge member is utilized to constrain or hold the two ends of the band in place.

Although one-piece clamps or cable ties are known and have been used in connection with electric cable or the like, it remains desirable to provide a one-piece cable tie that provides improved tightness whereby any gap that might result between the object and the band is reduced even for very small diameter objects, can be made relatively inexpensively without waste of material and can be readily fastened to a hose or cable. Further, it remains desirable to provide a one-piece cable tie that exhibits improved engagement characteristics between the band and the buckle. More specifically, there exists a need for a one-piece cable tie that promotes engagement of band to the buckle by reducing the friction existing therebetween. In that regard, the present invention is directed to a one-piece clamp for meeting such major objectives.

SUMMARY OF THE INVENTION

A one-piece cable tie is provided that includes a band or strap section and a buckle section integrally formed at one end of the band section. The band or strap section includes a free end for wrapping about an electrical cable or the like and joining to the buckle section. The other end of the band is operatively connected to, and coplanar with, a first portion of the buckle section. The first portion of the buckle section terminates adjacent to a slot that receives the free end of the band or strap section. The buckle further includes a second portion that is longitudinally offset from, and resident in a different plane than, the first portion. The second portion includes a slot end that, like the first portion, terminates adjacent to the aforementioned slot and a free end which defines the end of the cable tie.

The cable tie is preferably used to attach an electrical cable, shielding or the like to a connector. In a first method of attachment the band section is disposed about the object to be constrained and then the free end of the band section is inserted through the slot. With the buckle being held in place the free end of the band section is then drawn or pulled away from the buckle thereby tightening the band about the object. Once the band is sufficiently taut about the object the band can then be locked in place. In the preferred embodiment the band is locked in place by bending it around the second portion of the buckle that is adjacent to the slot and then trimming the excess band. In a second method of connection of the one-piece cable tie to the electrical cable or the like the free end of the band section is passed about the object a second time and then inserted through the slot a second time before tightening the band about the object. Thus, the object is wrapped by the band section twice thereby achieving a stronger and more durable connection between the electrical cable, shielding or the like and the connector.

The buckle configuration of the present invention is important since it reduces any gap between the band and the object constrained that can be attributed to the interruption of the flexible band section by a rigid buckle section. Further, the reduction in the gap allows the cable tie to be used with objects having a broad range of diameters. More specifically, for an object having a given diameter there is a direct correlation between the length of rigid buckle material adjacent the object and the size of the gap between the band and the object when the band is locked in place. Thus, the greater the length of the rigid buckle material adjacent the object of a given diameter the greater the resulting gap when the band is locked in place. Consequently, it is desirable to reduce or minimize the length of the rigid buckle material adjacent the object. Similiarly, for a buckle having a given length of rigid material adjacent an object there is an inverse relationship between the size of the gap and the diameter of the object constrained when the band is locked in place. Thus, the size of the gap between the band and the object increases with the decreasing diameter of the object constrained for a given length of rigid buckle material adjacent the object. The gap can, however, be reduced for any given diameter of object by, as previously mentioned, reducing the length of the rigid buckle material adjacent the object. From the foregoing it can be appreciated that by reducing or minimizing the length of the rigid buckle material adjacent the object the gap between the band and the object when the band is locked in place can be similarly reduced. The present invention by positioning only the first portion of the buckle adjacent to the object can reduce the length of the first portion thereby reducing any gap between the band and the object. Concomitantly, by reducing the length of the first portion, the cable tie can be used with objects having a broad range of diameters.

In addition, the buckle configuration of the present invention facilitates the engagement of the free end of the band section with the buckle by longitudinally separating the edges of the first and second portions of the buckle adjacent to the slot. The distance between the edges adjacent the slot provides ample space for insertion of the free end of the band section when the band is loosely wrapped about the object. Consequently, engagement of the band section to the buckle section is facilitated since the aforementioned space provides a freedom of movement for the band thereby reducing friction between the band and buckle.

Another embodiment of the one-piece cable tie includes a raised portion or bridge and a pair of slots formed on opposing sides of the raised portion. One of the two slots is defined as an end slot that is located closer to the free end of the buckle section while the second of the two slots is defined as an intermediate slot that is located between the raised portion and the band section.

As with the previously described embodiment, the cable tie is preferably used to attach electric cable, shielding or the like to a connector. In a first method of attachment, the band section is disposed about the object to be constrained and then the free end of the band section is inserted first through the end slot, then below the raised portion and then through the intermediate slot. The band can then be wrapped a second time around the object and, at the completion of the second wrap, the free end of the band is inserted a second time through the end slot, raised portion and intermediate slot. In a second and preferred method of connection of the one-piece cable tie to the electric cable or the like, the free end of the band section is inserted initially only through the intermediate slot after the band section is positioned about the cable. Subsequently, the free end is again wound or wrapped about the object whereby the second wrap of the band section overlaps the first wrap. At the completion of the second wrap, the free end of the band section is inserted for the first time through the end slot of the buckle section and then beneath the raised portion and then a second time through the intermediate slot. This preferred wrap configuration is important in clamping relatively small diameter objects. With such objects, a gap between the band and the object can develop along the length of the rigid buckle. When this occurs, the desired tightness or snugness between the band and object is diminished. Such a gap or gaps is reduced when the second method of clamping is employed since there is only a small step or discontinuity at the portion of the buckle where the band passes through the intermediate slot.

The preferred method of making cable ties of the present invention involves a machining process whereby the amount of metal material utilized is reduced because buckle sections are formed at alternating ends of band sections. In particular, a sheet of metal is provided having a width at least equal to the length of the one-piece cable tie. The machining process includes cutting and stamping steps whereby buckle sections are formed at opposite sides of the sheet metal. Each buckle section at one side of the sheet metal is offset from a corresponding buckle section formed at the opposite side of the sheet metal. Consequently, when each band section is formed as a result of cutting the sheet material in a direction transverse to the longitudinal extent of the sheet metal, a cable tie is formed with the buckle section at one side of the sheet metal and the next cable tie that is formed has its buckle section formed at the opposite side of the sheet metal. Hence, the use of all available metal on the sheet material is enhanced and, correspondingly, waste of metal is reduced in making the cable ties.

In view of the foregoing summary, it is readily seen that important objectives have been achieved by the present invention. A one-piece cable tie is provided that can be single or double wrapped about an object. Further, the buckle configuration of the cable tie reduces any gap between the first or underlying wrap and the object being constrained whereby desired snugness is achieved. Further, the cable tie of the present invention facilitates the engagement of the strap with the buckle. The cable ties of the present invention can be made by means of a relatively inexpensive manufacturing process. Consequently, when the cable ties are preferably made of stainless steel, which is a relatively expensive material, the cost of making the cable ties is maintained at a commercially acceptable level. The cable tie of the present invention is also relatively simple in construction and is not cumbersome to utilize in connection with achieving its clamping function.

Additional advantages of the present invention will become readily apparent from the following discussion, when taken in conjunction with the accompanying drawings.

BRIEF DESCRIPTION OF THE DRAWINGS

FIGS. 17A-17B are top and side views, respectively, illustrating the step of forming the end and intermediate slots of the buckle section for the second cable tie;

FIGS. 18A-18B are top and side views, respectively, illustrating the step of punching the raised portion of the buckle section for the second cable tie; and FIGS. 19A-19B are top the side views, respectively, illustrating the step of forming lips adjacent to the outer edges of the buckle section for the second cable tie.

DETAILED DESCRIPTION OF THE INVENTION

In accordance with the present invention, a clamping device is disclosed. The clamping device is a cable tie 20 having particular utility in connection with clamping or fastening electrical cables, shielding of the like to a connector. With reference to FIGS. 1-5 the cable tie 20 includes a band or strap section 22 having a first free end 24, a buckle end 26, a top side 28 and a bottom side 30. The buckle end 26 is designated using a dotted line in FIGS. 1 and 5, although it should be understood that the band 22 is integral with the buckle section and the dotted line merely providing a convenient reference for differentiating the band 22 from the buckle section. Further, the band or strap section 22 is of any length sufficient to wrap about the object being constrained.

Figure 1:
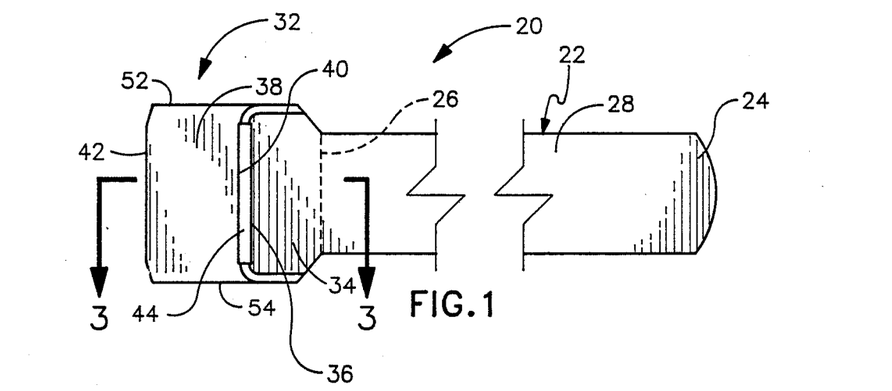
FIG. 1 is a top view of a cable tie of the present invention.
Figure 2:
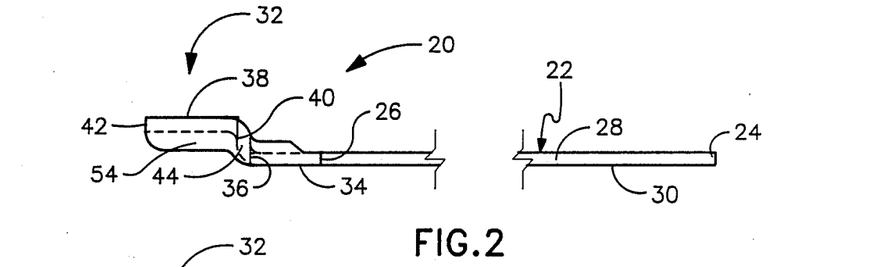
FIG. 2 is a side view of the cable tie of FIG. 1.
Figure 3:
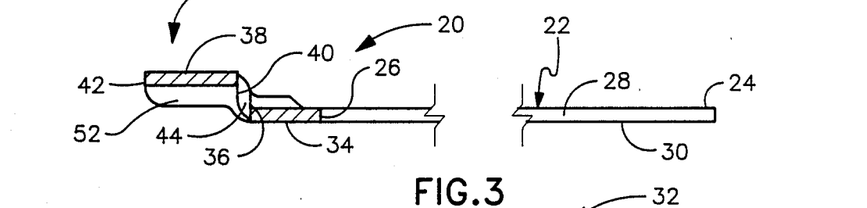
FIG. 3 is a side view of the cable tie of FIG. 1 with the buck section being shown in cross-section.
Figure 4:
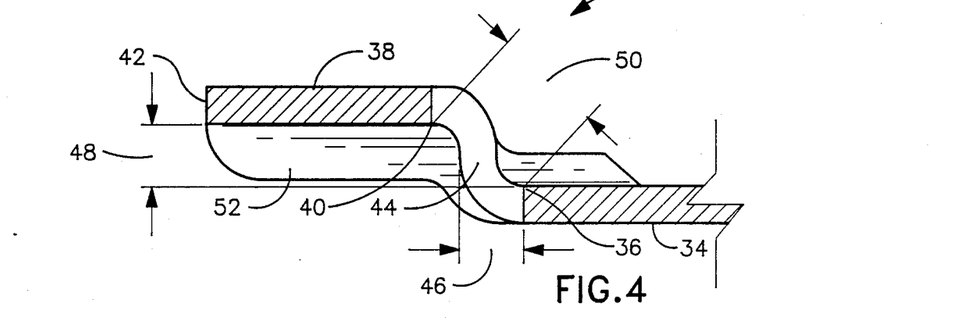
FIG. 4 is an enlarged cross-sectional view of the buckle section of the cable tie of FIG. 1.
Figure 5:
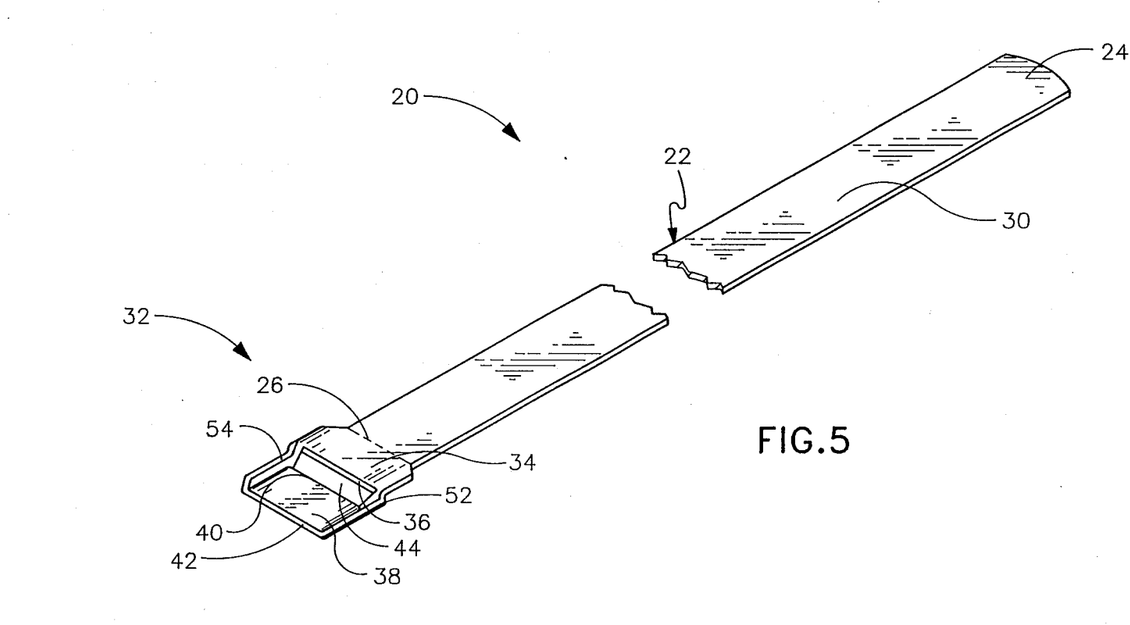
FIG. 5 is of the cable tie of FIG. 1 as seen from the bottom side.

The cable tie 20 further includes the buckle section 32 that is integrally formed with the band or strap section 22 as more fully described hereinafter. The buckle section 32 includes a first portion 34 that extends from, and is substantially coplanar with, the buckle end 26 of the band section 22. A first slot edge 36 defines the end of the first portion 34. Also included in the buckle section 32 is a second portion 38 that extends in a plane different from that occupied by the first portion 34 and the band section 22. The longitudinal limits of the second portion 38 are defined by a second slot edge 40 and a second free end 42. Further, the buckle section 32 includes a slot 44 located intermediate the first slot edge 36 of the first portion 34 and the second slot edge 40 of the second portion 38. The slot 44 receives the first free end 24 of the band section 22 when using the cable tie 20. With reference to FIG. 4, the second portion 38 is longitudinally or horizontally offset with respect to first portion 34 by a first distance 46 that is arbitrarily defined to be the horizontal or longitudinal distance between the first and second slot edges 36, 40. Similarly, the second portion 38 is vertically offset with respect to first portion 34 by a second distance 48 that is also arbitrarily defined to be the vertical distance between the first and second slot edges 36, 40. The second distance 48 is, preferably, a multiple of the thickness of the band or strap section 22. Further, a third distance 50 exists between the first and second slot edge 36, 40. In addition, as will be appreciated by those skilled in the art, the third distance 50 is greater than either the first distance 46 or the second distance 48 due to the right triangular relationship established between the first and second slot edges 36, 40 with respect to the first, second and third distances 46, 48 and 50. Further, it can be readily appreciated that by varying the first distance 46 and/or the second distance 48 the third distance 50 can be varied.

The buckle section 32 also includes a first side member 52 and a second side member 54 for connecting the first portion 34 to the second portion 38. The first and second side members 48, 50 extend upwardly from first portion 34 thereby facilitating the seating of the buckle section 32 in a groove or recessed area that is typically formed in the object being constrained. Similarly, the first and second side members 52, 54 extend downwardly from the second portion 38 to, among other things, allow the buckle section 32 to be fitted in the aforementioned groove and to aid in guiding in the first free end 24 of the band section 22 into the slot 44.

Figure 6A:
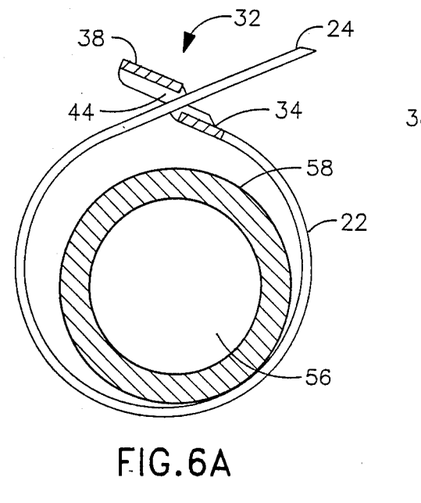
FIGS. 6A-6B illustrate the cooperation between the band and the buckle sections of the cable tie of FIG. 1 for a single wrap of an object.
Figure 6B:
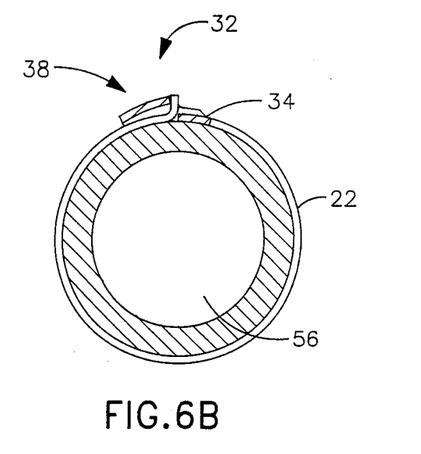

Having described the preferred embodiment of the invention it is now necessary to describe the method of using the invention. With reference to FIGS. 6A, 6B, 7A and 7B an electrical cable, shield or the like 56 having an exterior surface 58 is illustrated. One method of using the cable tie 20, illustrated in FIGS. 6A and 6B, is to single wrap the electrical cable 56. Initially, the first free end 24 of the band section 22 is wrapped about the electrical cable 56 and inserted through the slot 44. When the cable tie 20 is loosely wrapped about the electrical cable 56, as shown in FIG. 6A, the first free end 24 is angularly disposed relative to the buckle section 32. As a consequence thereof the effective width of the slot 44 is defined by essentially the third distance 50. The third distance 50 being greater than the height of the band section 22 provides the band section 22 with room to move thereby reducing frictional contact and facilitating the initial engagement of the band section 22 to the buckle section 32. With the buckle section 32 held in place the band section 22 is drawn or pulled away from the buckle section 32 thereby tightening the band section 22 about the electrical cable 56. As the band section 22 is drawn tighter and contact between the first portion 34 and the exterior surface 58 of the electrical cable 56 commences the angle between the band section 22 and the buckle section 32 is reduced thereby forcing the band section 22 to occupy the slot 44 which now has an effective width defined, essentially, by the second distance 48. The second distance 48 being less than the third distance reduces the freedom of movement provided the band section 22 when it was loosely wrapped about the electrical cable 56. Consequently, there is an increase in the frictional contact between the band section 22 and the buckle section 32. Once the band is sufficiently taut about the electrical cable 56 the band section 22 can be locked in place. In the preferred embodiment the band section 22 is locked in place by bending it upward and around the second slot edge 40. The excess band section is then trimmed to provide a flush connection. A preferred tool for achieving these functions of tightening, bending, and cutting is disclosed in the U.S. Pat. application Ser. No. 07/224,562, a filing date of Jul. 25, 1988, entitled "Tool For Tightening Cable Ties", and assigned to the same assignee as this application.

Figure 13:
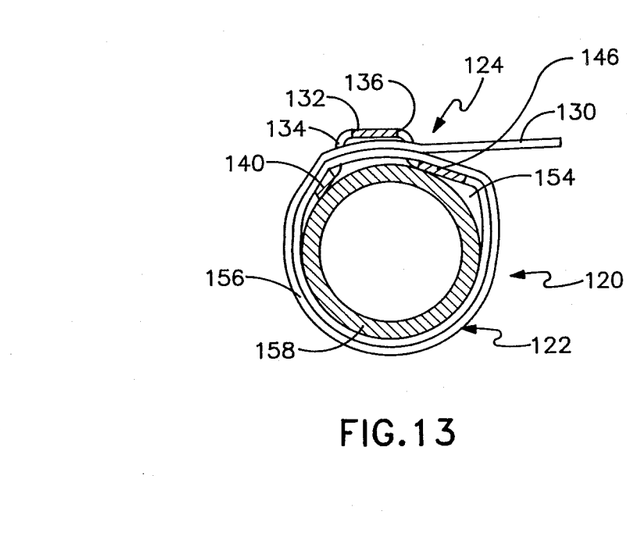
FIG. 13 illustrates a method of double wrapping a smaller diameter object using the cable tie of FIG. 8 in which band portions of the underlying wrap are supported along the buckle thereby creating unwanted gaps.
Figure 14:
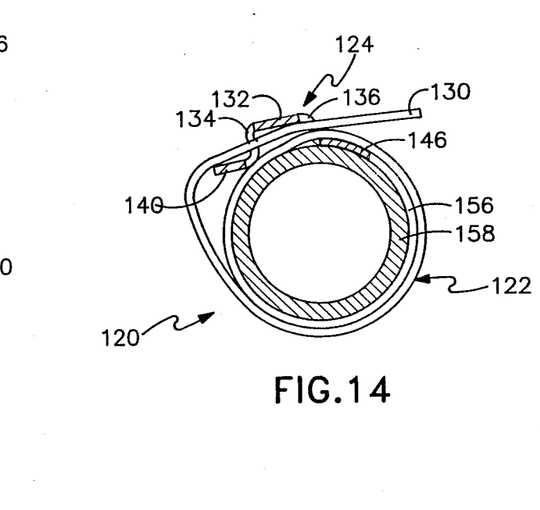
FIG. 14 illustrates the double wrapping method using the cable tie of FIG. 8 about a smaller diameter object in which improved tightness is achieved between the underlying wrap and the object.

With reference to FIG. 6B, the cable tie 20 of the present invention also reduces any gap between the band section 22 and the exterior surface 58 of the electric cable 56 that can be attributed to the interruption of the flexible band section 22 by the rigid first portion 34 of the buckle section 32. More specifically, for an object having a given diameter there is a direct correlation between the length of the rigid buckle material adjacent the object and the size of the gap between the flexible band and the object when the band is locked in place. Thus, the greater the length of the rigid buckle material adjacent the object of a given diameter the greater the resulting gap when the band is locked in place. Consequently, it is desirable to reduce or minimize the length of the rigid buckle material adjacent the object. Similarly, for a buckle having a portion or portions of a given length of rigid material positioned adjacent an object there is an inverse relationship between the size of the gap and the diameter of the object constrained when the band is locked in place. Thus, the size of the gap between the band and the object increases with the decreasing diameter of the object constrained for a given length of rigid buckle material adjacent the object. The gap can, however, be reduced for any given diameter of object by, as previously mentioned, reducing the length of the rigid buckle material adjacent the object. From the foregoing it can be appreciated that by reducing or minimizing the length of the rigid buckle material adjacent the object the gap between the band and the object when the band is locked in place can be similarly reduced. The cable tie 20 positions only the first portion 34 of the buckle section 32 adjacent to the object. Consequently, by reducing the length of the first portion 34 the gap between the band section 22 and the exterior surface 58 of the electric cable 56 is reduced thereby providing a superior connection. Concomitantly, by reducing the length of the first portion 34 of the buckle section 32, the cable tie 20 can be used with objects having a broad range of diameters, and especially those having a relatively small diameter. The ability of the cable tie 20 to reduce the gap between the band section 22 and an object having a relatively small diameter is best illustrated in FIGS. 13 and 14 which are directed to a cable tie 120, a second embodiment of the invention. As can be seen by comparison of FIGS. 13 and 14 by positioning only a base member 146 adjacent to an object 158 rather than both a foot member 140 and the base member 146, the gap between a band section 122 and the object 158 is reduced. Similarly, by positioning only the first portion 34 of the cable tie 20 adjacent to the electrical cable 56, the gap between the band section 22 and the electrical cable 56 is reduced thereby allowing the cable tie 20 to be used with objects having a broad range of diameters.

Figure 7A:
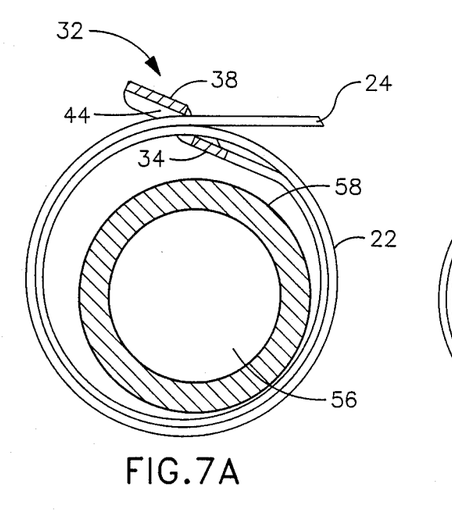
FIGS. 7A-7B illustrate the cooperation between the band and the buckle sections of the cable tie of FIG. 1 for a double wrap of an object.
Figure 7B:
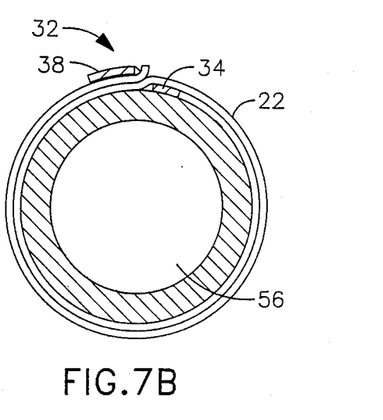

As illustrated in FIGS. 7A and 7B, the band section 22 can also be double wrapped about the electrical cable 56 thereby increasing the strength and durability of the connection between the electrical cable 56 and, for example, a electrical connector while at the same time providing the advantages associated with the single wrap.

Figure 8:
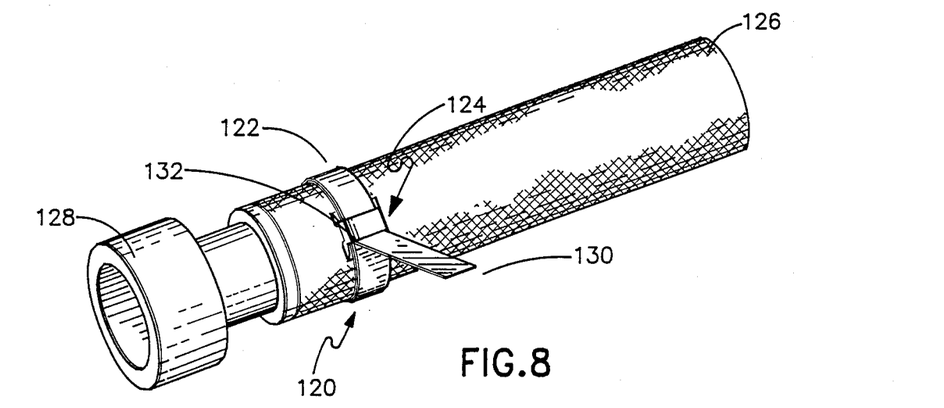
FIG. 8 is a perspective view of a second cable tie of the present invention illustrating its application as a clamp for attaching electric shielding or the like to an electrical connector.
Figure 9:
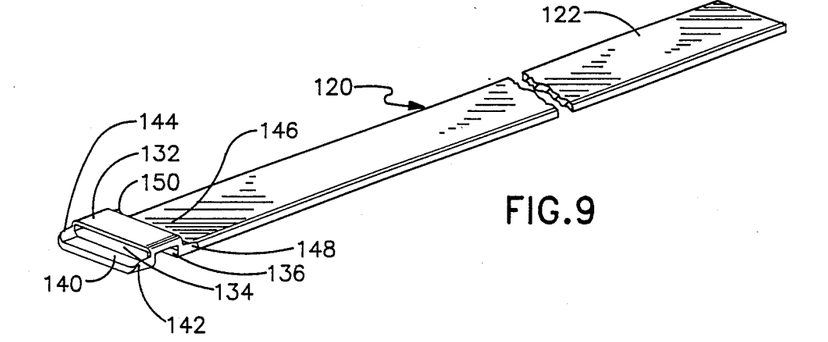
FIG. 9 is a perspective view of the cable tie of FIG. 8.
Figure 10:
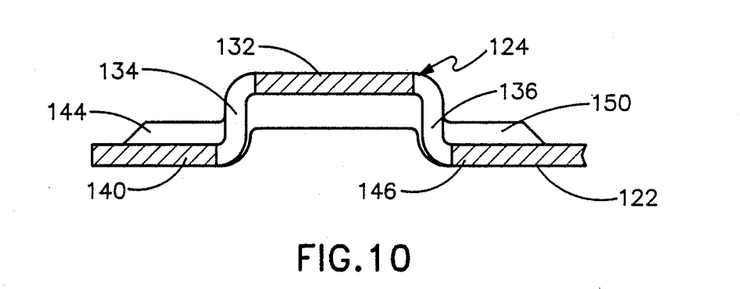
FIG. 10 is an enlarged, fragmentary view of the cable tie of FIG. 8 illustrating the buckle section and only portions the band section.

A second embodiment of the clamping device is a cable tie 120 having particular utility in connection with clamping or fastening electric cable such as shielding or the like, as illustrated in FIG. 8. With reference to FIGS. 8-10, the cable tie 120 includes a band or strap section 122 and a buckle section 124, which is integrally formed with the band section 122 at one end thereof. The band section 122 may have a variety of lengths and, as seen in FIG. 8, has a length sufficient to be wrapped about an object to be constrained. In particular, in a preferred embodiment, the object is electric shielding 126 or the like that is connected to an electrical connector 128 by wrapping the band section 122 one or two times through the buckle section 124 and, after tightening the cable tie 120 about the electric shielding 126, creating a lock by, for example, bending and cutting the part 130 of the band section 122 extending through the buckle section 124.

The buckle section 124 is integrally formed with the band section 122 and includes a bridge or raised portion 132, which extends in a plane different from the plane of the band section 122. On a first side of the bridge 132 an end slot 134 is formed while on the second and opposite side of the bridge 132 an intermediate slot 136 is formed. The end slot 134 is disposed relatively more adjacent the free end of the buckle section 124 than is the intermediate slot 136. In one embodiment, the height of each of the slots 134, 136 is equal to about twice the thickness of the band section 122 so that two layers of the band section 122 can be received through the slots 134, 136.

The buckle section 124 also includes a foot member 140 located at the free end thereof. At the edges of the foot member 140 a pair of lips 142, 144 are formed and extend from the free end of the foot member 140 to the side of the bridge 132 that is adjacent to the end slot 134. The buckle section 124 also includes a base member 146 defined between the intermediate slot 136 and the end of the band section 122. Like the foot member 140, the base member 146 has a pair of raised edges or lips 148, 150. The lips 148, 150 of the base member 146 extend from the end of the band section 122 to the side of the bridge 132 adjacent to the intermediate slot 136.

Both the foot member 140 and the base member 146 are formed such that their planes are somewhat depressed or located below the plane of the band section 122 and this occurs typically during the formation of the bridge 132. The lips 142, 144 of the foot member 140 and the lips 148, 150 of the base member 146 are provided so that the buckle section 124 is able to readily fit into or be received by a groove or recessed area that may typically be formed in the electric shielding 126 or the like. That is, when such a groove is formed in the electric shielding 126, the width of the buckle section 124 is not so great as to prevent proper seating in the groove due to the formation of the lips 140-142 and 148-150.

Figure 11:
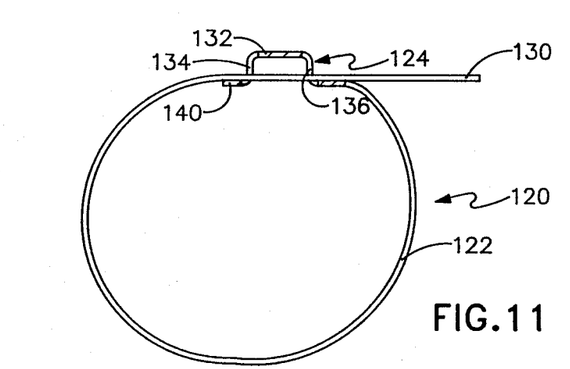
FIG. 11 illustrates a single wrap of the band section of the cable tie of FIG. 8 with the free end of the band section be inserted first through the end slot and then intermediate slot.

In connection with utilizing the one-piece cable tie 120 to clamp an object such as the electric shielding 126, reference is made to FIGS. 11 and 12A-12C. One way of wrapping the band section 122 about the object is illustrated in FIG. 11. In this embodiment, the free end of the band section 122 is first inserted through the end slot 134 and subsequently inserted through the intermediate slot 136. Although not illustrated, the band section 122 could be wrapped a second time to create a double wrap, with the free end of the band section 122 being inserted a second time through the end slot 134, beneath the raised portion 132 and then through the intermediate slot 136 again. After the desired number of wraps, the part 130 of the band section 122 extending from the intermediate slot 136 can be bent and cut to create a locking condition.

Figure 12A:
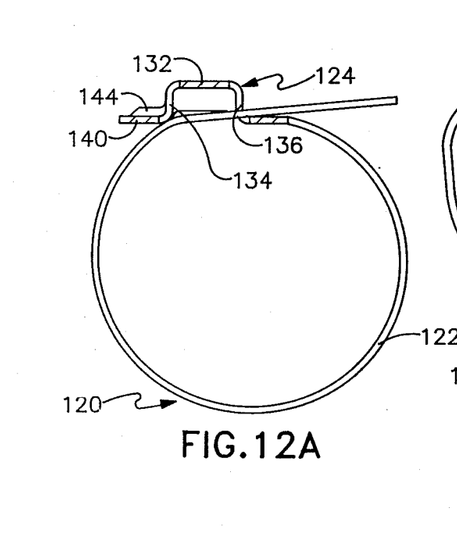
FIGS. 12A-12C illustrate the method of providing a double wrap of the band section of the cable tie of FIG. 8 in which the free end thereof is first inserted through the intermediate slot and then through the end slot of the buckle section.
Figure 12B:
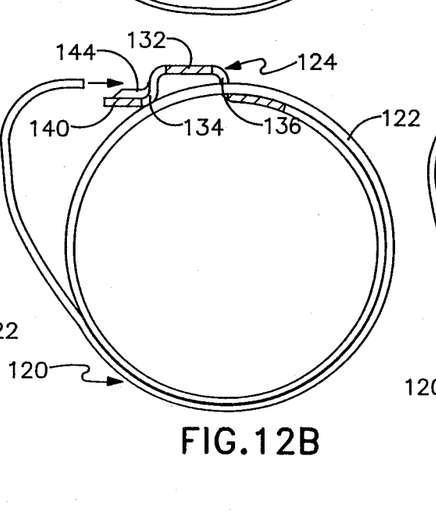
Figure 12C:
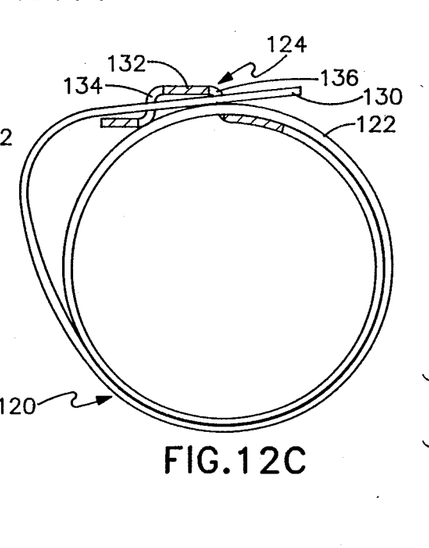

A second embodiment for wrapping the band section 122 about an object is illustrated in FIGS. 12A-12C. In this illustrated method of clamping, the free end of the band section 122 is first inserted through the intermediate slot 136, rather than the end slot 134, to provide the first wrap about the object to be clamped. After being positioned through the intermediate slot 136 but not the end slot 134, the free end of the band section 122 is wrapped or positioned a second time about the object to define a double wrap. Subsequent to providing the double wrap, the free end of the band section 122 is then inserted through the end slot 134 of the buckle section 124 and movement of the free end is continued once again through the intermediate slot 136. This double wrap configuration results in two radially adjacent layers of band section 122 with only the top layer being received through the end slot 134 while both layers are received through the intermediate slot 136.

The second method of wrapping is preferred especially when smaller diameter objects are being clamped. With reference to FIG. 13, the first method of wrapping is illustrated in connection with a relatively small diameter object. As can be seen, gaps or spaces 154 result between the contacting or underlying band layer 156 and the object 158. Such gaps 154 are created adjacent to the length of the buckle section 124 and are due to the interruption of the flexible band section 122 by the rigid buckle section 124. That is, along the length of the buckle section 124, the band section 122 is supported causing band section portions of the contacting layer 156 to be spaced from the object 158. The contrast between this method and the preferred second method of wrapping the band section 122 is illustrated in FIG. 14. As seen in this figure, little gap or space is created between the contacting band section layer 156 and the object 158. This meaningful reduction in the unwanted spacing is due to the fact that the underlying layer is not supported along the length of the buckle section 124; instead, the connection to or engagement by the buckle section 124 is made only at that part thereof adjacent to the intermediate slot 136. Consequently, there is only a small discontinuity or step created at this junction between portions of the underlying band section layer 156 whereby the opportunity for the creation of a greater gap size is prevented. From the foregoing, it can be appreciated that the double wrap configuration is preferred because of the reduced size of the gap whereby improved clamping or snugness is achieved between the underlying band section layer and the object. This results in improved resistance to any force tending to uncouple the cable tie 120.

Figure 15:
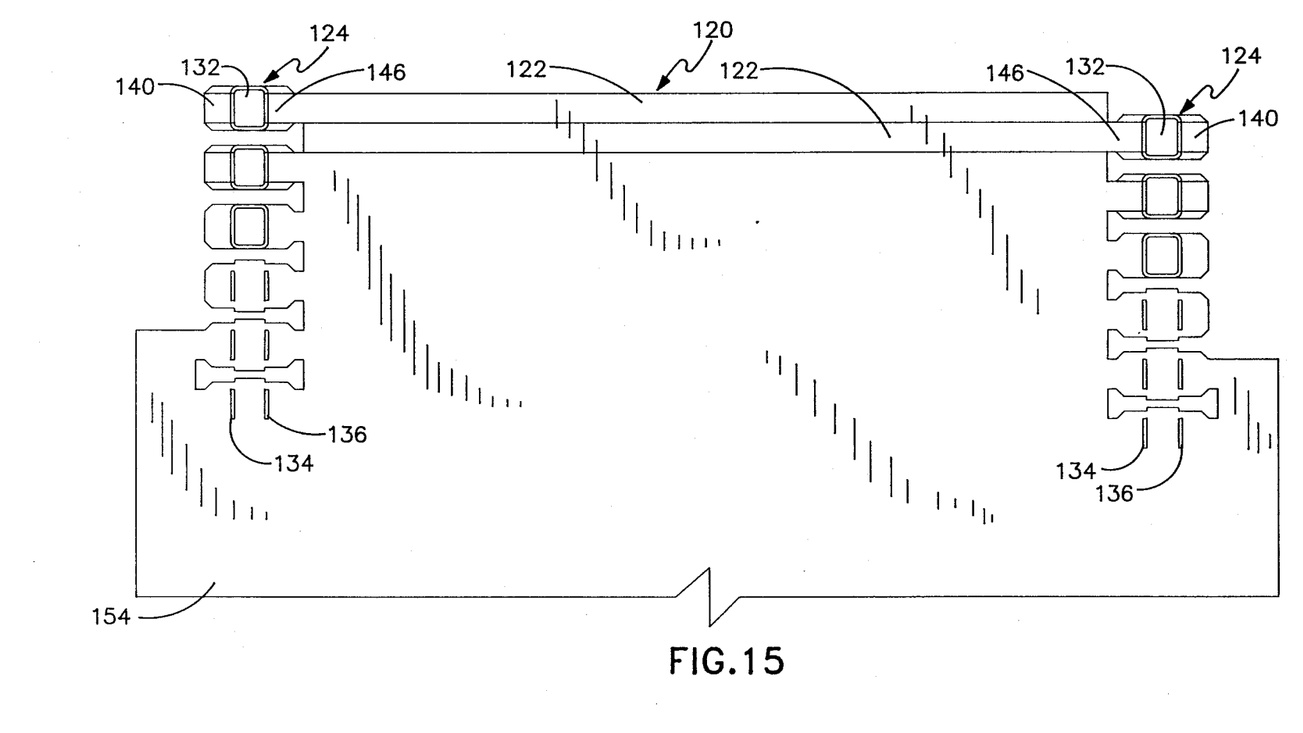
FIG. 15 illustrates the making of the second cable ties having buckle sections formed at alternating sides of a sheet of metal material.

With reference to FIGS. 15-19, a description is provided directed to the manufacture of cable ties 120 of the present invention. As illustrated in FIG. 15, a sheet of metal material 160, preferably stainless steel, is provided from which individual cable ties 120 can be machined or produced. Preferably, the metal sheet 160 has a width approximately equal to the longitudinal extent of each of the cable ties 120. An important aspect of the present invention is the alternate making of buckle sections 124 on opposite sides of the metal sheet 160. That is, a buckle section 124 of one cable tie 120 is formed on one side of the metal sheet 160 and the next adjacent cable tie 120 has its buckle section 124 formed on the opposite side of the metal sheet 160. As can be seen in FIG. 15, the alternating buckle sections result in offset buckle sections 124, i.e., they are not aligned along the longitudinal extents of the cable ties 120. This occurs because the width of the buckle section 124 cannot be the same as the width of the band section 122 of the same cable tie 120. This limitation exists because the width of the slots 134, 136 must be sufficient to accommodate the width of the band section 122 while the buckle section 124, particularly the bridge 132, must have sufficient structural integrity to avoid detaching or separating from the remaining portions of the buckle section 124. To achieve the desired manufacturing objectives, it is preferred that the width of the buckle section 124 be less than or equal to two times the width of the band section 122. As already noted, the width of the buckle section 124, on the other hand, must be great enough to properly receive the width of the band section 122.

Figures 16A, 16B:
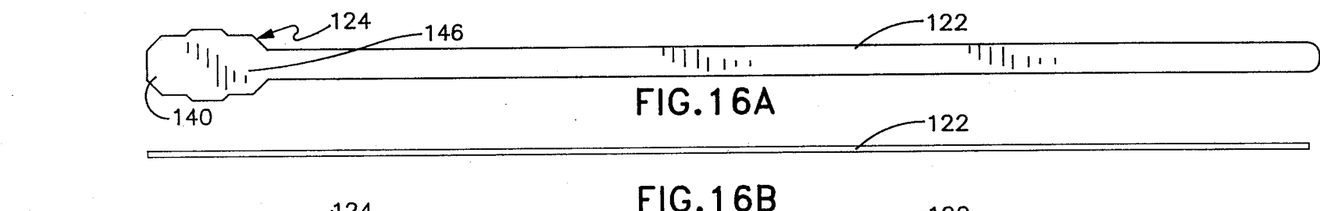
FIGS. 16A-16B are top and side views, respectively, illustrating the step of forming the buckle section of the second cable tie in which the outline of the buckle section is formed.
Figure 17A:
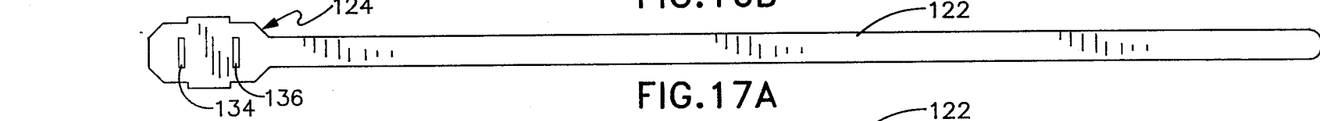
Figures 17B, 18A:
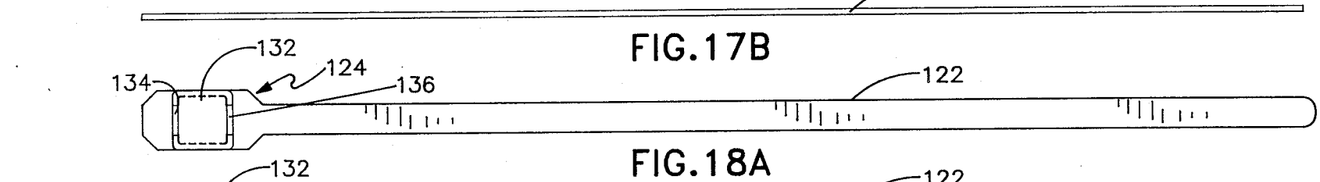

Referring to FIGS. 16A-19B and with continued reference to FIG. 15, steps are illustrated utilizing top and side views of the cable tie 120 at various stages of manufacture to illustrate its formation. FIGS. 16A-16B depict the outline of the buckle section 124, which is yet to be altered in order to create the finished buckle section 124. This outline of the buckle section 124 is cut from one side of the metal sheet 124 and has the desired dimensions for forming the finished buckle section 124. FIGS. 17A-17B illustrate the forming or cutting of the end slot 134 and the intermediate slot 136 in the buckle section 124. Although illustrated separately from the cutting or forming of the outline of the buckle section 124 in FIGS. 16A–16B, the slots 134, 136 could be formed at the same time. FIGS. 18A–18B depict the formation of the bridge or raised portion 132 provided in the mid-portions of the buckle section 124. The bridge 132 is preferably formed by punching or stamping the selected area of the buckle section after the slots 134, 136 are formed. Formation of the slots 134, 136 first before punching is preferred in order to avoid unwanted tearing of the metal that can degrade the structural integrity of the buckle section 124, although it should be understood that the bridge 132 could be formed without first creating the slots 134, 136. In such a case, the slots 134, 136 would be formed in conjunction with the punching of the buckle section to create the bridge 132. While the bridge 132 is being formed by punching the selected metal material in one direction, the machining process also results in the foot member 140 and the base member 146 being punched or moved slightly in the opposite direction to produce the desired height of the slots 134, 136 for accommodating two layers of the band section 122.

Lastly, FIGS. 19A–19B illustrate the buckle section 124 with the formed lips 142, 144 of the foot member 140 and the lips 148, 150 of the base member 146. To form the lips 142–144 and 148–150, the buckle section 124 is positioned between two mating members in which one of the mating members has inclined ledges corresponding to the shape of the lips 142–144 and 148–150 to be formed. Consequently, when the two mating or pressing members come together, one of the two members causes the outer edges of the buckle section 124 to be bent or raised thereby creating the lips 142–144 and 148–150, as illustrated in FIGS. 19A–19B.

The cable tie 120 can also be manufactured with the band section 122 being separate from the buckle section 124. In such an embodiment the band section 122 can be joined to the buckle section 124 by spot welding one end of the band section 122 to either the foot member 140 or the base member 146, preferably, at the underside thereof. Alternatively, the band section 122 can be joined to the buckle section 124 by inserting one end of the band section 122 through either the slot 134 or the slot 136, and bending the end thereof about, respectively, either the foot member 140 or the base member 146. The band section 122 could also be passed along the bottom of either the foot member 140 or the base member 146 before being bent and passed through, respectively, either the slot 134 or the slot 136.

The method of making the cable tie 20 is substantially identical to the method utilized to make the cable tie 120. There are, however, certain differences between the two methods which can be attributed to the lack of any structure in the cable tie 20 that corresponds to the end slot 134, the foot member 140 and the lips 142, 144 of the cable tie 120. Given these differences, the method of manufacturing the cable tie 20 includes the step of outlining or cutting the buckle sections 32 of the cable ties 20 from opposite sides of a suitable material, such as stainless steel. Further, the method includes the formation of the slot 44. In addition, a punching or stamping step is included in the method to establish the vertical and horizontal offsets between the first and second portions 34, 38 of the buckle section 32. Furthermore, the method includes a shaping or forming of the first and second side members 52, 54 such that portions thereof extend upwardly from the first portion 34 and downwardly from the second portion 38.

Based on the foregoing description, a number of salient features of the present invention are readily discerned. Namely, the cable tie of the present invention, due to its configuration, facilitates engagement of the band with the buckle. Further, the configuration of the cable tie functions to reduce any gap between the band the object constrained thereby improving the connection achieved and allowing the cable tie to be used to constrain objects having a broad range of diameters. In addition, a cable tie is provided for use with electric cable or the like wherein increased contact is made between the object and the band section due to the novel way of double wrapping whereby improved tightness is achieved. The buckle section is uniquely configured with raised edges so that it is easily accommodated in a groove typically formed in the electric cable. Cable ties of the present invention can be relatively inexpensively manufactured by a machining process in which buckle sections are alternately formed on opposing sides of a sheet of metal material. Relatedly, use of the metal material from which the cable ties are made is enhanced whereby waste of material is reduced.

Although the present invention has been described with reference to particular embodiments, it should be appreciated that further embodiments can be provided within the spirit and scope of this invention.

What is claimed is:

1. A clamping device for reducing the size of any gap between the object constrained and band portions adjacent the object, comprising:
   a band section for wrapping around an object, said band section having a first free end and extending in a first plane; and
   a buckle section integrally formed with said band section, said buckle section including a first portion operatively connected to said band section and extending substantially in said first plane, said buckle section further including a second portion having a second free end, said second free end being located on the opposite end of said buckle section from which said band section extends, substantially all portions of said second portion being longitudinally offset from said first portion and extending in a second plane different from said first plane, said buckle section further including a slot intermediate said first portion and said second portion for receiving said first free end;
   wherein said second portion including said second free end thereof is positioned in non-contacting relation with the object being constrained during the tightening of said band section about the object and in which substantially all of said first portion of said buckle section contacts the object after the object has been constrained and with said first free end of said band section being located outwardly of portions of said band section to which it is adjacent after said clamping device is tightened and locked.

2. A clamping device, as claimed in claim 1, wherein: said buckle section has a width less than or equal to two times the width of said band section.

3. A clamping device, as claimed in claim 1, wherein: said first portion includes a first slot edge adjacent said slot; and
   said second portion includes a second slot edge adjacent said slot, wherein the distance between said first and second slot edges is greater than the distance between said first and second planes to facilitate engagement of said band section with said buckle section.

4. A clamping device for reducing the size of any gap between the object constrained and band portions adjacent the object, comprising:
   a band section for wrapping around an object, said band section having a first free end and extending in a first plane; and
   a buckle section connected to said band section, said buckle section including a first portion operatively connected to said band section and extending substantially in said first plane, said buckle section further including a second portion longitudinally offset from said first portion and extending in a second plane different from said first plane, said second portion having a second free end being located on the opposite end of said buckle section to which said band section is connected, said second portion including said free end thereof being in spaced relationship with the object being constrained during tightening of said band section about the object, said buckle section further including a slot intermediate said first portion and said second portion for receiving said free end, wherein said first portion can be of reduced length to reduce any gap between said band section and the object due to said second portion having a different shape than the object adjacent said first portion;
   wherein substantially all of said first portion contacts the constrained object and said first free end of said band section is located outwardly of portions of said band section to which it is adjacent after the clamping device is tightened and locked.

5. A clamping device, as claimed in claim 4, further including:
   a foot member connected to said second portion and extending in a plane substantially common with said first plane;
   a second slot defined between said foot member and said second portion for receiving a second wrap of said band section; and
   a pair of raised lips connected to said foot member.

6. A method for clamping an object to reduce the size of any gap between the object constrained and band portions adjacent the object, comprising:
   providing a one-piece cable tie including a band section having a first free end and a buckle section, said buckle section including a first portion connected to said band section, said buckle section further including a second portion longitudinally offset from, raised relative to and separated by a slot from said first portion of said buckle section, said second portion including a second free end with said band section being connected to an end of said buckle section opposite said second free end;
   contacting substantially all of said first portion of said buckle section with the object;
   positioning said band section about the object a first time;
   inserting said first free end of said band section through said slot a first time;
   providing a spaced relationship between said second portion and the object constrained during tightening of said band section about the object; and
   locking said band section about the object while locating said first free end of said band section outwardly of portions of said band section to which it is adjacent.

7. A method, as claimed in claim 6, further comprising:
   positioning said band section about the object a second time; and
   inserting said free end of said band section through said slot a second time.

8. A method, as claimed in claim 6, wherein:
   said step of locking includes shearing said band section wherein said first free end of said band section becomes a sheared free end extending in a direction away from the object.

9. A method, as claimed in claim 6, wherein:
   said step of inserting includes disposing said band section at an oblique angle relative to said slot.

10. A method, as claimed in claim 6, wherein:
    said step of locking includes maintaining said second free end of said buckle section facing in a direction away from said first free end during tightening of said one-piece cable tie about the object.

* * * * *